US011505153B2

(12) United States Patent
Fuma et al.

(10) Patent No.: US 11,505,153 B2
(45) Date of Patent: Nov. 22, 2022

(54) AIRBAG APPARATUS (71) Applicant: Autoliv Development AB, Vargarda (SE)

(72) Inventors: Makoto Fuma, Kanagawa (JP); Yoshihiro Yamada, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 17/044,100

(22) PCT Filed: Apr. 5, 2019

(86) PCT No.: PCT/JP2019/015102
§ 371 (c)(1),
(2) Date: Sep. 30, 2020

(87) PCT Pub. No.: WO2019/198632
PCT Pub. Date: Oct. 17, 2019

(65) Prior Publication Data
US 2021/0031717 A1 Feb. 4, 2021

(30) Foreign Application Priority Data

Apr. 9, 2018 (JP) .............................. JP2018-074499

(51) Int. Cl.
B60R 21/207 (2006.01)
B60R 21/2338 (2011.01)
(Continued)

(52) U.S. Cl.
CPC ........ B60R 21/207 (2013.01); B60R 21/2338 (2013.01); B60R 21/23138 (2013.01);
(Continued)

(58) Field of Classification Search
CPC ............ B60R 21/207; B60R 21/23138; B60R 21/2338; B60R 2021/23146; B60R 2021/23386; B60R 2021/23161
(Continued)

(56) References Cited

U.S. PATENT DOCUMENTS 9,533,648 B2 * 1/2017 Fujiwara ............... B60R 21/207
9,663,061 B2 5/2017 Mihm
(Continued)

FOREIGN PATENT DOCUMENTS

JP 2008-302897 A 12/2008
JP 2009-029182 A 2/2009
(Continued)

OTHER PUBLICATIONS

International Search Report of the International Searching Authority for PCT/JP2019/015102 dated Jun. 11, 2019.
(Continued)

Primary Examiner — Keith J Frisby
(74) Attorney, Agent, or Firm — Stephen T. Olson (57) ABSTRACT To effectively retain a deployed airbag without increasing installation man hours, in addition to suppressing rotation of this airbag in a direction away from a seat. For example, a side airbag apparatus 1 installed inside a backrest SB of the seat S includes: an airbag 2; an inflator 3 provided inside the airbag 2; a tether 4; and a bracket 5. The airbag 2 is deployed in a first direction in which a base end side 2a thereof is attached to a seat back frame SBF and the tip side thereof is distant from the backrest SB. The tether 4 includes: one end 4a attached to the seat back frame SBF; and the other end which extends in the first direction on the outer surface of the airbag 2 in the deployed state so as to be attached to the part on the tip side 2b of the airbag 2. A bracket 5 is attached to the seat back frame SBF and provided in the direction in
(Continued)

which the tether 4 extends. The tether 4 is supported by the front end of the bracket 5.

13 Claims, 6 Drawing Sheets

(51) Int. Cl.
    *B60R 21/231*     (2011.01)
    *B60R 21/00*     (2006.01)

(52) U.S. Cl.
    CPC ............... *B60R 2021/0048* (2013.01); *B60R 2021/23146* (2013.01); *B60R 2021/23382* (2013.01); *B60R 2021/23386* (2013.01)

(58) Field of Classification Search
    USPC .......................................... 280/730.2, 743.2
    See application file for complete search history.

(56) References Cited

U.S. PATENT DOCUMENTS

| | | |
|---|---|---|
| 2010/0194083 A1 | 8/2010 | Sugimoto et al. |
| 2014/0062069 A1 | 3/2014 | Fukawatase |
| 2015/0314748 A1 | 11/2015 | Mihm |
| 2015/0367804 A1 | 12/2015 | Fujiwara |
| 2016/0144818 A1 | 5/2016 | Mihm et al. |
| 2016/0159306 A1 | 6/2016 | Fujiwara |

FOREIGN PATENT DOCUMENTS

| | | |
|---|---|---|
| JP | 2011-178189 A | 9/2011 |
| JP | 2013-193564 A | 9/2013 |
| JP | 2014-051138 A | 3/2014 |
| JP | 2014-54956 A | 3/2014 |
| JP | 2016-007901 A | 1/2016 |
| JP | 2016-107721 A | 6/2016 |
| JP | 2017-514746 A | 6/2017 |
| JP | 2017-535473 A | 11/2017 |
| JP | 2018-039505 A | 3/2018 |

OTHER PUBLICATIONS

English translation of International Search Report of the International Searching Authority for PCT/JP2019/015102 dated Jun. 11, 2019.

* cited by examiner

AIRBAG APPARATUS

TECHNICAL FIELD

The present invention relates to, for example, an airbag apparatus which is installed in a vehicle in order to protect passengers upon a collision of the vehicle.

Hereinafter, in the present application, "up (upper)" and "above" mean the head direction of the passenger seated in a regular state, while "down (lower)" and "below" similarly mean the foot direction. Moreover, "anterior" and "front" mean the front side of the passenger seated in a regular state, while "posterior" and "rear" similarly mean the back side direction. Moreover, "left" and "left direction" refer to the left hand direction of the passenger seated in a regular condition, while "right" and "right direction" similarly refer to the right hand direction.

BACKGROUND

For example, when the vehicle is impacted from the side (hereinafter, referred to as "upon a side collision"), a side airbag apparatus suppresses a passenger from moving in the direction in which the impact acts, thereby protecting the passenger. The side airbag apparatus is installed laterally inside the backrest of a seat (hereinafter, referred to as a "seat back").

This side airbag apparatus is configured such that, for example, upon a side collision, an output signal transmitted by a sensor (which has detected an impact) operates an inflator so as to generate gas in order to deploy an airbag on the side of the passenger seated in the seat.

If the side airbag apparatus is installed on the near side on the side door side, the rotation of the deployed airbag in the direction away from the seat is prevented by the side door. Unfortunately, if the side airbag apparatus is installed on the far side distant from the side door, there is no pressure wall such as a side door which prevents this rotation, on the rotation side in the direction of the deployed airbag away from the seat. Consequently, the rotation needs to be suppressed by retaining the deployed airbag.

If the side airbag apparatus is installed on the far side, it is particularly necessary for the rotation of the deployed airbag to be more suppressed, for example, when a passenger is only seated in the driver seat but not seated in the passenger seat, than when passengers are seated in both the driver seat and the passenger seat.

With that, various side airbag apparatuses are proposed which are configured so as to suppress the rotation of this airbag in the direction away from the seat when a deployed airbag collides with a passenger.

For example, Patent Document 1 discloses a side airbag apparatus which provides: a first tether (wherein, one end thereof is coupled to the upper part of the seat, while the other end thereof is coupled to the front position of an airbag); and a second tether (wherein, one end thereof is coupled to the lower position of the seat, while the other end thereof is coupled to the front position of the airbag). In the case of the side airbag apparatus disclosed in this Patent Document 1, the first tether and the second tether retain the deployed airbag so as to suppress the rotation of the airbag in the direction away from the seat.

Moreover, Patent Document 2 discloses a side airbag apparatus, wherein a support member fixed to a seat frame supports the rear end surface of an airbag, and wherein a tether restrains the tip side of the airbag from rotating in the direction away from the seat. In the case of the side airbag apparatus disclosed in this Patent Document 2, the support member and the tether retain the deployed airbag, suppressing the rotation of this airbag in the direction away from a seat.

Moreover, Patent Document 3 discloses a side airbag apparatus which is configured such that as an airbag is deployed, a strap stretched between the airbag and a support plate pulls the support plate so as to rotate from the housing position to the protruding position. In the case of the side airbag apparatus disclosed in this Patent Document 3, the support plate rotated to the protruding position catches the deployed airbag, suppressing the rotation of this airbag in the direction away from a seat.

However, in the case of the side airbag apparatus disclosed in Patent Documents 1 and 2, the tether is not supported by the intermediate part, even when one end thereof is only coupled to the airbag, while the other end thereof is only coupled to the seat (seat frame). Consequently, when a passenger collides with the deployed airbag, this airbag is rotated in the direction away from the seat, with the coupling position between the tether and the seat (seat frame) serving as the fulcrum. In this case, the moment of force for rotating the tip side of the airbag in the direction away from the seat increases, making it impossible to sufficiently suppress the rotation.

In contrast, the side airbag apparatus disclosed in Patent Document 3 catches the deployed airbag with a support plate, presumably not causing such problems of Patent Documents 1 and 2. However, in addition to the installation of an airbag (hereinafter, also referred to as an airbag module) provided inside an inflator, a support plate, a bracket (which rotatably retains this support plate), etc. must be installed, consequently increasing the man hours required to install the side airbag apparatus.

RELATED ART DOCUMENTS

Patent Documents

Patent Document 1: Japanese Translation of International Application Publication No. 2017-514746
Patent Document 2: Japanese Unexamined Patent Application Publication No. 2014-54956
Patent Document 3: Japanese Unexamined Patent Application Publication No. JP 2011-178189

SUMMARY OF THE INVENTION

Problem to be Solved by the Invention

The following points are problems to be solved by the present invention. In the case of the side airbag apparatus disclosed in Patent Documents 1 and 2, regarding the rotation of the deployed airbag in the direction away from the seat, the rotation is not sufficiently suppressed because the moment of rotational force increases, with the coupling position to the seat (seat frame) serving as the fulcrum.

Moreover, in the case of the side airbag apparatus disclosed in Patent Document 3, in addition to the installation of the airbag module, a support plate, a bracket (which rotatably retains this support plate), etc. must be installed, consequently increasing the man hours required to install the side airbag apparatus.

Means for Solving the Problem

The present invention solves these problems, and an object thereof is to effectively retain a deployed airbag with a tether without increasing the installation man hours required to install an airbag apparatus, in addition to suppressing the rotation of the deployed airbag in the direction away from a seat as much as possible.

That is, the present invention is an airbag apparatus installed inside at least the backrest of a seat.

The airbag apparatus includes: an airbag which is deployed in a first direction in which the base end side thereof is attached to a seat back frame provided inside the backrest and the tip side thereof is distant from the backrest; and an inflator which is provided inside this airbag, receives a signal from a sensor, generates gas, and deploys the airbag.

In the present invention, the airbag apparatus further includes: a tether including one end attached to the seat back frame, with the other end extending in the first direction on the outer surface of the airbag in the deployed state so as to be attached to the part on the tip side of the airbag or attached to the seat; and a bracket which is attached to the seat back frame and provided in the direction in which the tether extends.

In addition, the tether is characteristically supported by the front end of the bracket.

That is, in the present invention, because the tether is supported by the front end of the bracket, when the airbag, upon being deployed in the first direction (for example, the direction forward distant from the backrest of the seat), rotates in the direction away from the seat, the fulcrum is the front end of the bracket. Consequently, the moment of rotary force decreases, making it possible to effectively suppress the rotation. At this time, one end of the tether is preferably configured so as to be sandwiched between the bracket and the seat frame.

Moreover, in the present invention, at the same time that the airbag module is attached to the seat back frame, the bracket can be attached to the seat back frame, preventing an increase in the man hours required for the installation.

If a hook part hooked to the seat back frame is formed on the front end of the bracket, the attachment state to the seat back frame is stable.

Moreover, by providing the bracket with a hole passing through a stud bolt of the inflator or a screw hole mated with the stud bolt, the bracket can be easily attached to the seat back frame.

Moreover, the bracket may be provided for any of outside the side part of the seat back frame, inside the side part thereof, or at the upper edge part thereof. Note that "inside the side part of the seat back frame" refers to the central side of the seat on the side part in the horizontal direction, while "outside the side part of the seat back frame" refers to the non-central side of the seat on the side part in the horizontal direction. Moreover, the upper edge part of the seat back frame refers to either the upper part of the side part of the seat back frame or an upper member of the seat back frame. If the bracket is provided outside the side part of the seat back frame, the tether is disposed between the seat back frame and the bracket. In contrast, if the bracket is provided inside the side part of the seat back frame, the tether is disposed between the seat back frame and the airbag.

Moreover, by providing the bracket with a hole through which a stud bolt of the inflator passes or a screw hole mated with the stud bolt, the bracket can be easily attached to the seat back frame.

The airbag apparatus according to the present invention can be applied to a side airbag apparatus, a shroud type airbag apparatus (which integrally has a protecting chamber covering the head of a passenger along with a side protecting chamber protecting the side of the passenger), and an airbag apparatus having the airbag protecting both sides of the passenger.

If the present invention is a side airbag apparatus, while it may be installed in either the side on the far side of the seat back or the side on the near side of the seat back, it is more effective when installed on the far side.

Effect of the Invention

In the present invention, when a passenger collides with the deployed airbag, the rotation of this airbag in the direction away from the seat can be effectively suppressed, improving the protecting function of passengers using the airbag.

In particular, the present invention is effective when applied to an airbag which is installed in a position without a pressure wall (for example, a side door) which prevents this rotation.

BRIEF DESCRIPTION OF THE DRAWINGS

In FIG. 4, (a) is a view obtained by viewing from above a state in which the airbag of the airbag apparatus according to the present invention (which is applied to the side airbag apparatus installed in the seat back frame on the far side of the passenger seat) is deployed, while (b) is an enlarged view of portion A.

EMBODIMENT OF THE INVENTION

Among conventional side airbag apparatuses which suppress the rotation of this airbag in the direction away from the seat when a deployed airbag collides with a passenger, a side airbag apparatus which suppresses the rotation with a tether has a great moment of rotational force, preventing the rotation from being sufficiently suppressed.

In contrast, in a side airbag apparatus which suppresses the rotation by rotating a support plate to the protruding position, in addition to the installation of the airbag module, a support plate, a bracket (which rotatably retains this support plate), etc. must be installed, consequently increasing the man hours required to install the side airbag apparatus.

The present invention solves the problems for a case in which, for example, the tether (which includes one end attached to a seat back frame, with the other end attached to the tip side in the deployment direction on the outer surface of an airbag) is supported by the front end of the bracket attached to the seat back frame.

EXAMPLES

Examples of the present invention will hereinafter be described with reference to the appended drawings. FIGS. 1 to 4 are views describing Example 1 for a case in which an airbag apparatus according to the present invention is applied to a side airbag apparatus.

Figure 1:
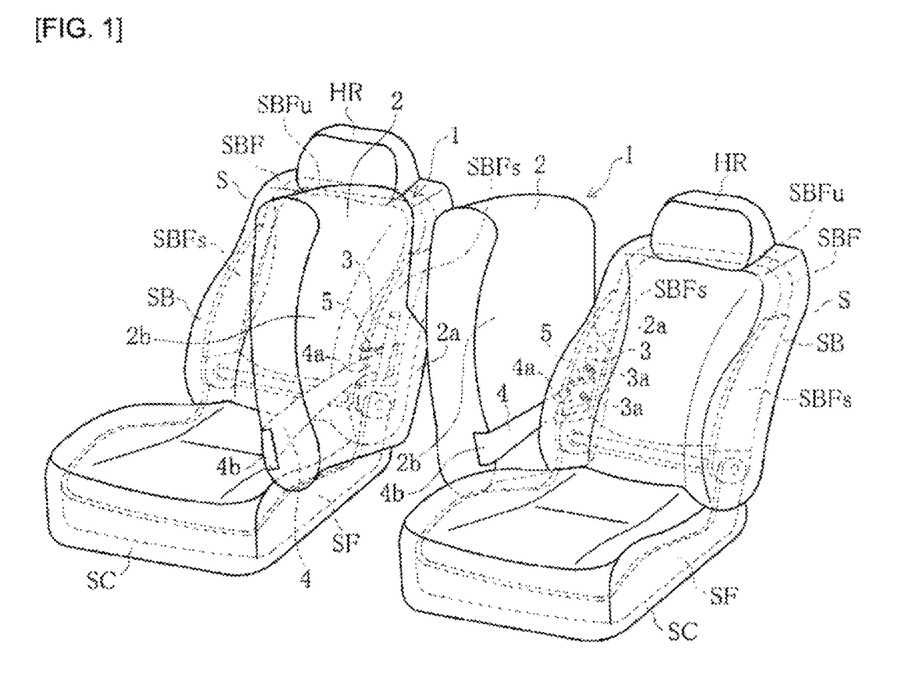
FIG. 1 is a perspective view illustrating the deployed state of an airbag for a case in which an airbag apparatus according to the present invention is applied to a side airbag apparatus installed in a seat back frame on the far side.
Figure 2:
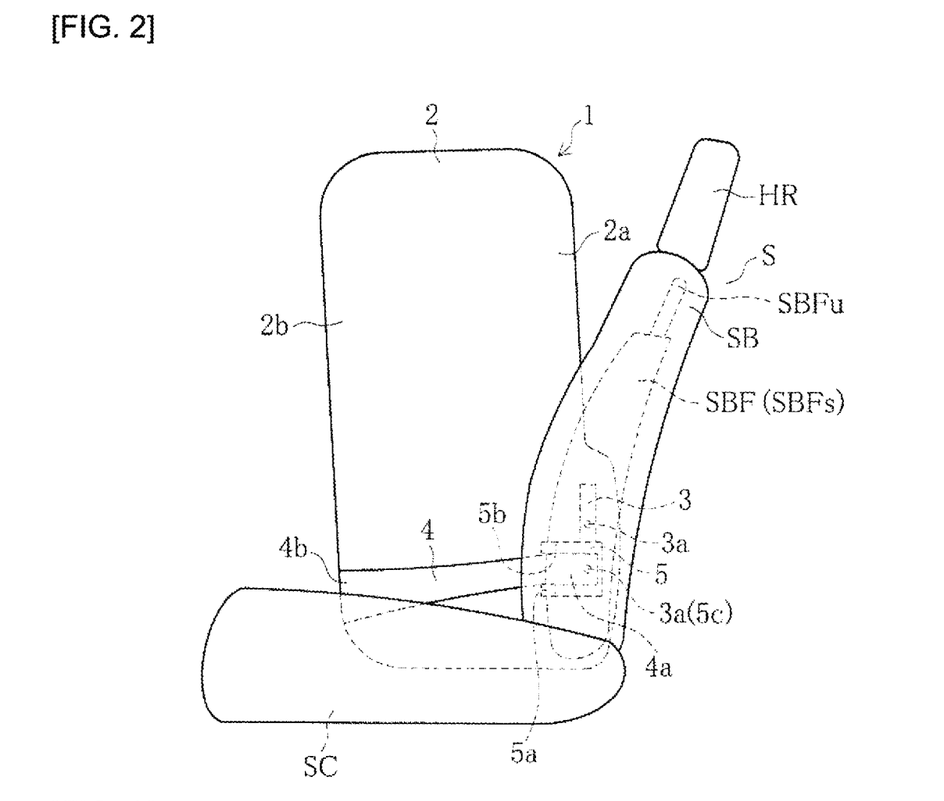
FIG. 2 is a side view obtained by viewing a deployed state of the airbag from the side door side for a case in which the airbag apparatus according to the present invention is applied to the side airbag apparatus which is installed in the seat back frame on the far side of a passenger seat.

A side airbag apparatus 1 according to the present invention is attached inside a seat back SB of a seat S having a seat cushion SC, a seat back SB, and a headrest HR.

This side airbag apparatus 1 includes: an airbag 2; and for example, a cylindrical inflator 3 which receives an output signal from a sensor and emits gas from the outer side thereof into the airbag 2.

Among the same, the airbag 2 is configured to be formed so as to be longer in the vertical direction than in the anteroposterior direction and formed into a bag shape so as to have a thickness in the width direction of a vehicle, wherein, for example, the inflator 3 is disposed inside the base end side 2a in the deployed state.

Moreover, two stud bolts 3a are provided on the outer side of this inflator 3 with an appropriate interval therebetween in the longitudinal direction so as to protrude. In addition, these stud bolts 3a are used to attach the airbag 2 to the seat back SB. Specifically, in the seat frame SF functioning as the framework of the seat S, the airbag 2 is attached to a side part SBFs of a seat back frame SBF disposed inside the seat back SB.

4 is a tether which is attached to the outer surface of the airbag 2 when the airbag 2 is in the deployed state. This tether 4, for example, is attached to the side relative to the passenger P of the airbag 2, with the stud bolt 3a of the inflator 3 inserted into a hole 4c provided on one end 4a side and attached to the part of the base end side 2a on the outer surface of the airbag 2. Moreover, for example, the other end 4b is bonded below the part of the tip side 2b on the outer surface of the airbag 2 in the forwardly deployed state.

Figure 3:
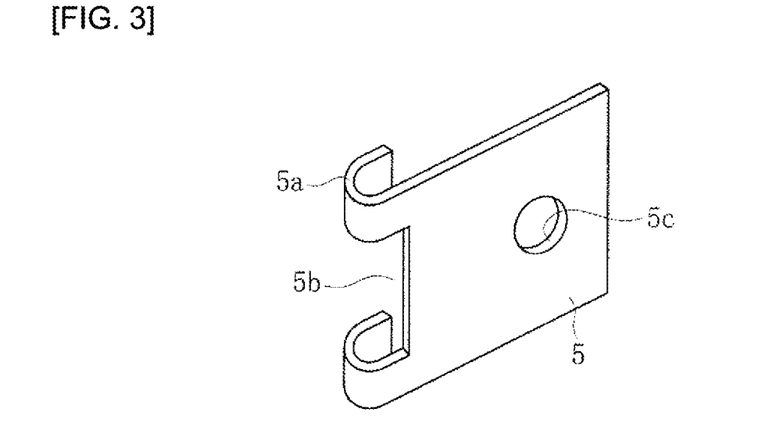
FIG. 3 is a perspective view illustrating one example of a bracket configuring the airbag apparatus of the present invention.

5 is a bracket which, for example, forms: a hook part 5a hooked to the side part SBFs of the seat back frame SBF on the front end; and an insertion part 5b through which the tether 4 passes. Moreover, a hole 5c through which a stud bolt 3a of the iflator passes is provided on the rear side.

When the airbag module having this configuration is attached to the seat back frame SBF, the bracket 5, for example, is simultaneously attached to the outside of the side part SBFs of the seat back frame SBF in the direction in which the tether 4 extends.

This bracket 5 is attached to the seat back frame SBF by allowing a stud bolt 3a of the inflator 3 to pass through the hole 5c and hooking the hook part 5a on the front end of the side part SBFs of the seat back frame SBF.

Figure 4A:
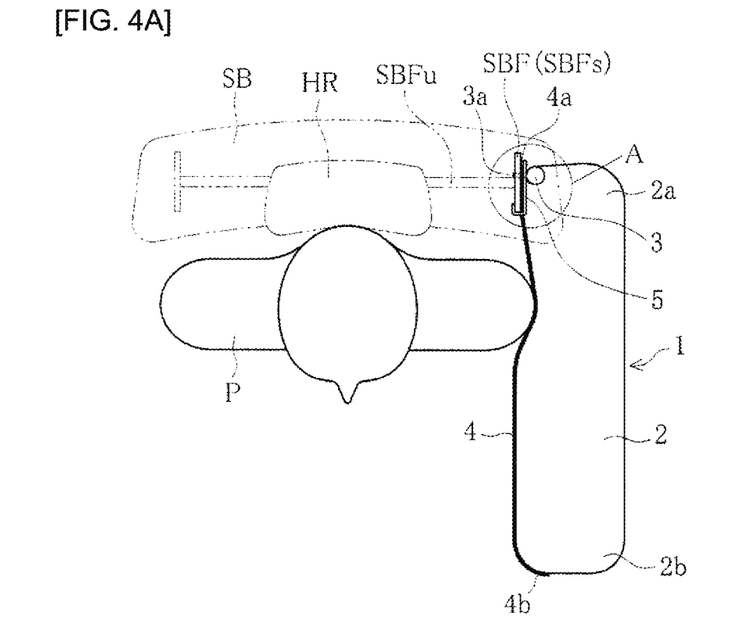
Figure 4B:
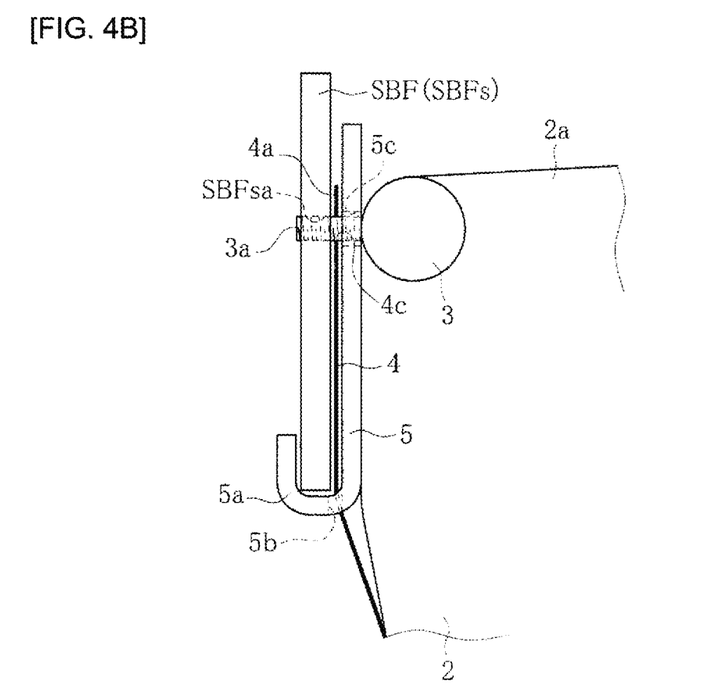

In the case of this Example 1, as illustrated in FIG. 4, the tether 4 is disposed between the side part SBFs of the seat back frame SBF and the bracket 5 and, for example, bonded to the tip side 2b of the airbag 2 through the insertion part 5b of the bracket 5.

In Example 1 having the abovementioned configuration, the stud bolts 3a are inserted into holes SBFsa provided on the side part SBFs of the seat back frame SBF so as to attach the airbag module to the seat back frame SBF. At this time, the bracket 5 can be simultaneously attached to the seat back frame SBF, preventing an increase in the man hours required for the installation.

Moreover, for example, if the passenger collides with the airbag 2 deployed upon a side collision and the airbag 2 rotates in the direction away from the seat S, the tether 4 is supported at the position passing through the insertion part 5b of the bracket 5. In addition, this supported position serves as the fulcrum, decreasing the moment of rotary force and making it possible to effectively suppress the rotation.

Figure 5:
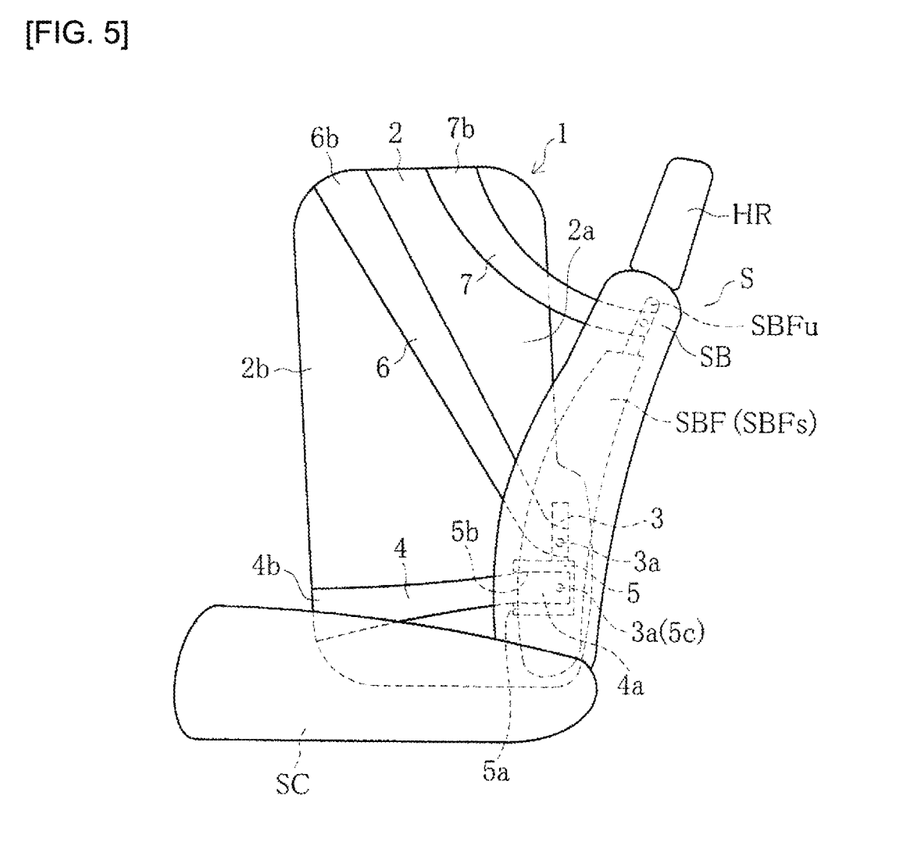
FIG. 5 is a view similar to FIG. 2 for a case in which three tethers, for example, are provided.

In Example 1 of FIGS. 1 to 4, only one tether 4 is provided; however, the tether 4 is not limited to one. For example, as illustrated in FIG. 5, two tethers 6, 7 other than the tether 4 may be provided.

Among these, the tether 6 is attached to the part of the base end side 2a on the outer surface of the airbag 2 by inserting a stud bolt 3a of the inflator 3 into a hole (provided on one end). In contrast, the other end 6b is coupled above the part of the tip side 2b on the outer surface of the airbag 2 in the deployed state.

Because this tether 6 also couples the other end 6b to the tip side 2b of the airbag 2, similar to the tether 4, the bracket 5 may be attached to this tether 6 so as to support the tether 6 at the front end of this bracket 5.

In contrast, one end side of the tether 7 is attached to the upper part of the side part SBFs of the seat back frame SBF in the vicinity of a headrest HR which is disposed at the part of the base end side 2a on the outer surface of the airbag 2. In contrast, the other end 7b is coupled above the central part in the anteroposterior direction on the outer surface of the airbag 2 in the deployed state.

Because this tether 7 is attached to the upper part of the side part SBFs serving as the upper edge part of the seat back frame SBF in the vicinity of the headrest HR, enhancing the effect of attracting the airbag 2 on the passenger side. Note that because the other end 7b thereof is coupled to the central part of the airbag 2 in the anteroposterior direction, the bracket 5 need not be attached to the tether 7 so as to support the tether 7.

Figure 6A:
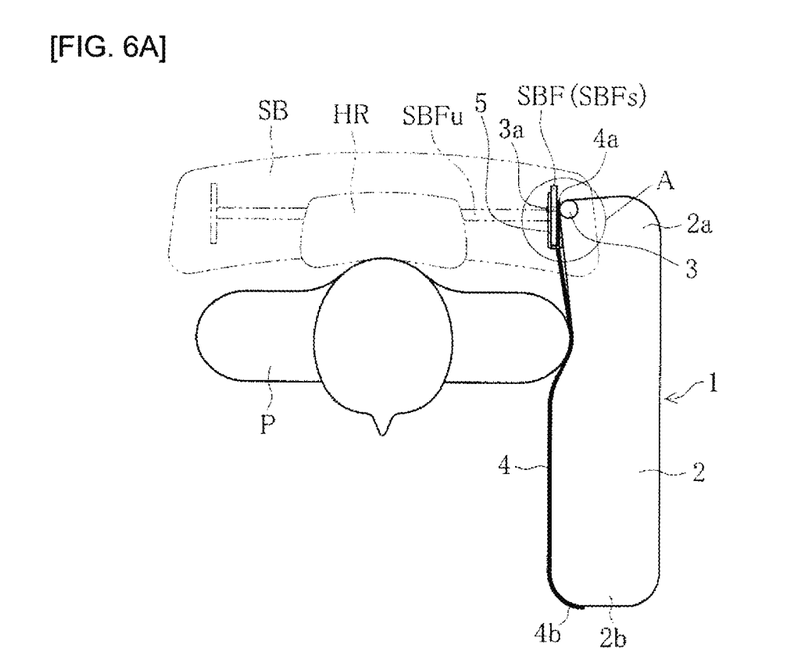
FIG. 6 is a view similar to FIG. 4 illustrating another example of the airbag apparatus according to the present invention applied to the side airbag apparatus.
Figure 6B:
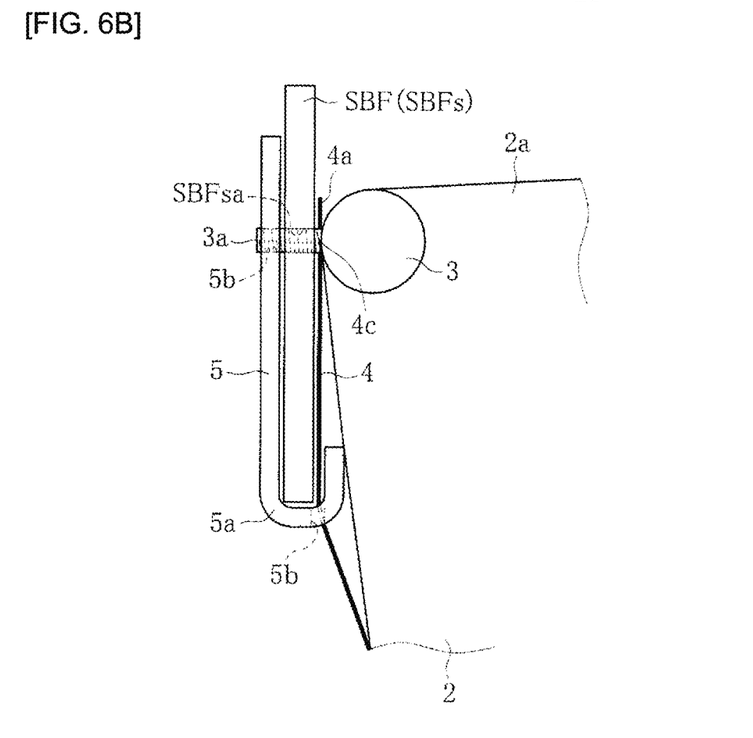

Moreover, as illustrated in Example 1 in FIGS. 1 to 4, the bracket 5 is provided outside the side part SBFs of the seat back frame SBF. However, for example, as illustrated in FIG. 6, the bracket 5 may be provided inside the side part SBFs of the seat back frame SBF. In this case, a hole provided in the bracket 5 is a screw hole mating with a stud bolt 3a. Moreover, the tether 4 is disposed between the seat back frame SBF and the airbag 2 and passes through the insertion part 5b of the bracket 5.

Moreover, in the case of the example of FIGS. 1 to 6, the case is described in which the hook part 5a is provided on the front end of the bracket 5, while the hole 5c or the screw hole which passes through a stud bolt 3a of the inflator 3 is provided on the rear side.

However, if the bracket 5 can be attached to the seat back frame SBF, the hook part 5a, the hole 5c, or the screw hole are not essential. Moreover, if the tether 4 can be supported by the front end of the bracket 5, the bracket 5, for example, may be formed into a hollow shape, instead of the insertion part 5b. Moreover, if the bracket 5 is provided inside the side part SBFs of the seat back frame SBF, the front end of the bracket 5 protrudes from the front end of the side part SBFs of the seat back frame SBF to the outside of the side part SBFs of the seat back frame SBF. In this case, this protruding part must be configured so as to be capable of supporting the tether 4.

Moreover, the case in which a side airbag apparatus 1 according to the present invention is attached to the far side is described in FIGS. 1 to 6. However, the side airbag apparatus 1 according to the present invention is not limited to being attached on the far side. For example, it may be installed in a seat which has no pressure wall (door) preventing the deployed airbag from rotating or in a seat of a vehicle (for example, a micro mobility in which both sides of the driver seat serve as edges of a vehicle, etc.) far from the driver seat if there is a pressure wall.

Needless to say, while the present invention is not limited to the abovementioned examples, the embodiments may be appropriately changed within the scope of the technical concepts described in each claim.

In other words, the airbag apparatus described above is a preferred example of the present invention, and embodiments other than those described also may be implemented or executed via a variety of methods. Unless particularly limited in the specification of the present application, the shape, size, and configuration, arrangement, etc. of the detailed parts illustrated in the appended drawings in the present invention are not restricted. Moreover, the expressions and terms used in the specification of the present application are for the purpose of description and are not limited thereto unless specifically limited.

For example, FIGS. 1 to 6 describe the application of the present invention to side airbag apparatuses. However, the present invention is not limited to being applied to side airbag apparatuses.

Figure 7:
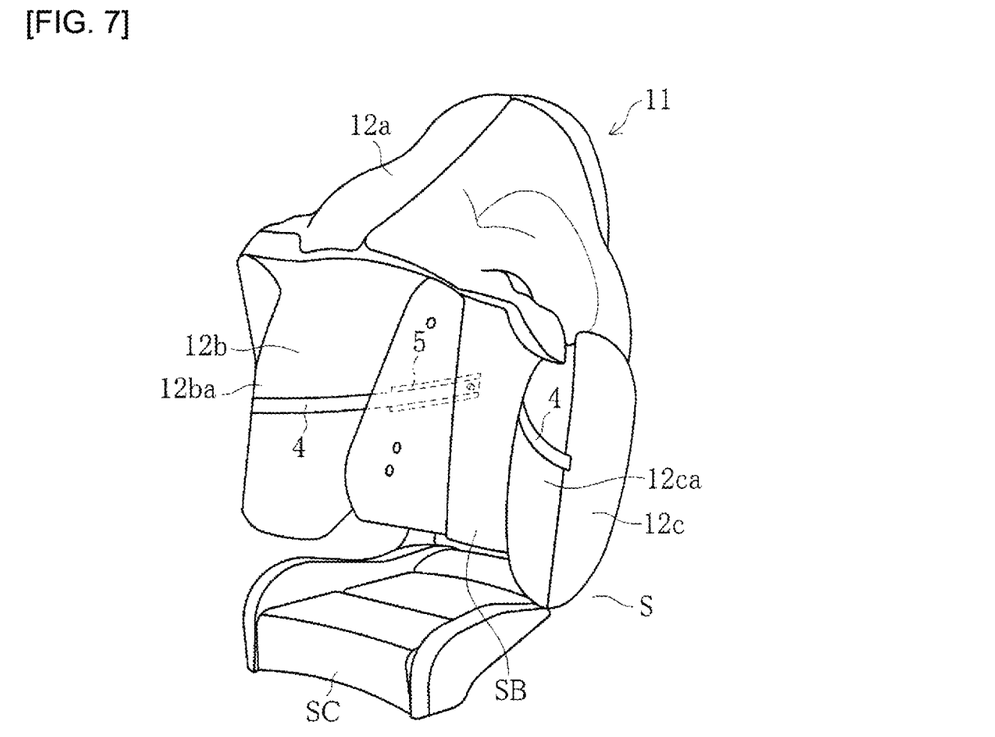
FIG. 7 is a perspective view illustrating a deployed state of an airbag for a case in which the airbag apparatus according to the present invention is applied to a shroud type airbag apparatus.

FIG. 7 is a shroud type airbag apparatus 11 which includes an airbag 12 in which a head protecting chamber 12a for protecting the head of a passenger is integrally formed with side protecting chambers 12b, 12c for protecting the side of the passenger.

In the case of this airbag apparatus 11, upon a collision, the deployed head protecting chamber 12a covers the head of the passenger (seated in the seat S) from above, while the side protecting chambers 12b, 12c, which are deployed on both sides of the passenger, restrain the passenger from moving in the lateral direction.

The present invention can also be applied to such a shroud type airbag apparatus 11. If the present invention is applied to this airbag apparatus 11, for example, the tip parts 12ba, 12ca of the left and right side protecting chambers 12b, 12c on the passenger side are connected to the side parts of the seat back frame via the tether 4. In contrast, the bracket 5 is attached to the side part of the seat back frame in the direction in which this tether 4 extends. The tether 4 is then supported by the front end of this bracket 5. Note that the aspect of the attachment of the tether 4 and the bracket 5 to the seat back frame is the same as that of the side airbag apparatus 1 described above.

In this case, upon a collision, the moving passenger allows the deployed side protecting chamber 12b or 12c to rotate in the direction away from the seat S. However, regarding the tether 4, because the front end of the bracket 5 serves as the fulcrum, the moment of rotary force decreases, making it possible to effectively suppress the rotation.

Figure 8:
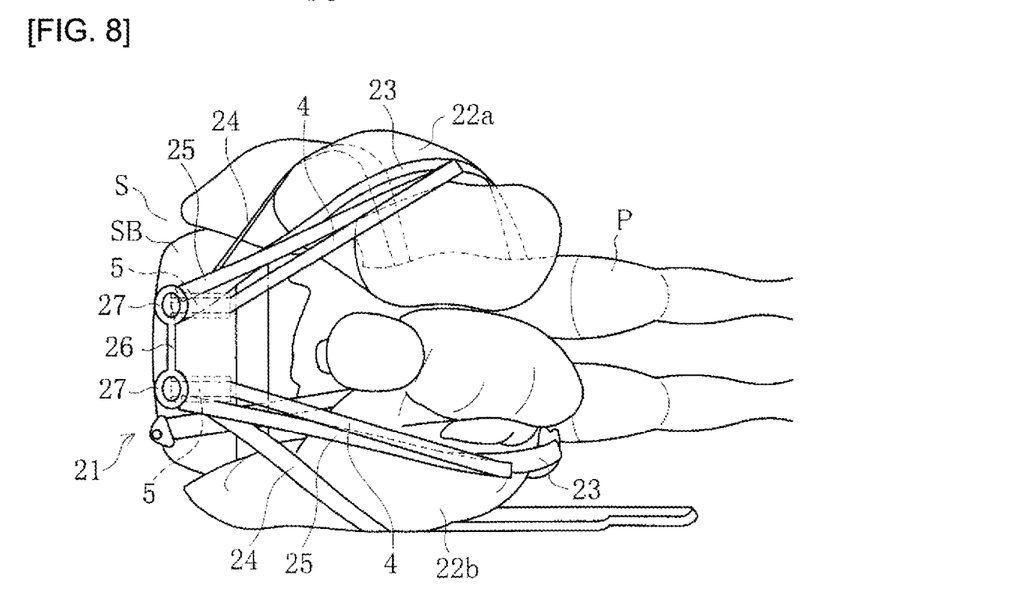
FIG. 8 is a perspective view illustrating a deployed state of an airbag for a case in which the airbag apparatus according to the present invention is applied to an airbag apparatus having the airbag deployed on both sides of a passenger.

Moreover, FIG. 8 is an airbag apparatus 21, wherein, upon a collision, airbags 22a, 22b deployed on both sides of the passenger seated in the seat S are configured so as to restrain the passenger from moving, and wherein at least a portion of the airbags 22a, 22b is housed in the seat back SB of the seat S.

In this airbag apparatus 21, upon deployment of the airbags 22a, 22b, for example, a first tensile cloth 23 and a second tensile cloth 24 are stretched on the side surface opposite the passenger P from the upper surface of the seat back SB to a seat cushion SC. Among these, the first tensile cloth 23 retains the surface on the front side of the airbags 22a, 22b opposite the passenger P. Moreover, the second tensile cloth retains the surface of the intermediate part of the airbags 22a, 22b opposite the passenger P in the anteroposterior direction.

FIG. 8 illustrates that, upon a collision, the airbags 22a, 22b pull a tether 25 exposed from the seat S, move a slide ring 27 forward, pull the first and second tensile cloths 23, 24, and bias the airbags 22a, 22b to the passenger P. Note that 26 is a ring member which couples two slide rings 27 (exposed from the seat) together with the tether 25.

The present invention may be applied to such an airbag apparatus 21. In this case, for example, through the non-passenger side of the left and right airbags 22a, 22b, the tether 4 connects the seat S to an upper member SBFu (see FIGS. 1, 2) serving as the upper edge part of the seat back frame SBF. In contrast, in order to be in the direction in which this tether 4 extends, the bracket 5 is attached to the upper member SBFu of the seat back frame SBF. The tether 4 is then supported by the front end of this bracket 5.

In this case as well, upon a collision, the moving passenger P allows the deployed airbag 22a or 22b to rotate in the direction away from the seat S. However, regarding the tether 4, because the front end of the bracket 5 serves as the fulcrum, the moment of rotary force decreases, making it possible to effectively suppress the rotation.

In FIGS. 7 and 8, while the present invention is applied to side chambers 12b, 12c and the airbags 22a, 22b on both sides, the present invention may be applied to the side chamber 12b or 12c and the airbag 22a or 22b on the far side.

Moreover, the tether 4 is disposed on the passenger side of the airbag 12 in FIG. 7, and disposed on the non-passenger side of an airbag 22 in FIG. 8; in contrast, the tether 4 may be disposed on the non-passenger side of the airbag 12 in FIG. 7, or disposed on the passenger side of the airbag 22 in FIG. 8.

EXPLANATION OF CODES

1 Side airbag apparatus
2 Airbag
2a Base end side
2b Tip side
3 Inflator
3a Stud bolt
4 Tether
4a One end
4b Other end
5 Bracket
5a Hook part
5b Insertion part
5c Hole
11 Airbag apparatus
12 Airbag
12a Head protecting chamber
12b Side protecting chamber
12ba Tip part
12c Side protecting chamber
12ca Tip part 21 Airbag apparatus
22 Airbag
23 First tensile cloth
24 Second tensile cloth
S Seat
SB Seat back
SBF Seat back frame
SBFs Side part of the seat back frame
SBFu Upper member of the seat back frame

The invention claimed is:

1. An airbag apparatus for a seat of a vehicle in combination with the seat, the airbag apparatus comprising:
    an airbag deployable from a backrest of the seat in a first direction in which a base end side of the airbag is attached to a seat back frame of the backrest and a tip side of the airbag is distant from the backrest;
    an inflator inside the airbag, the inflator operative to receive a signal from a sensor, generate gas, and deploy the airbag;
    a tether having one end attached to the seat back frame, with the other end extending in the first direction on an outer surface of the airbag in a deployed state so as to be attached to the tip side of the airbag; and
    a bracket attached to the seat back frame and provided in the first direction;
    wherein the tether is supported by a front end of the bracket, the bracket having a hook part hooked to a side part of the seat back frame and an insertion part through which the tether passes, wherein the tether is sandwiched between the bracket and the seat back frame.

2. The airbag apparatus according to claim 1, wherein the first direction is a forward direction distant from the backrest of the seat.

3. The airbag apparatus according to claim 1, wherein the bracket includes a hole through which a stud bolt of the inflator passes.

4. The airbag apparatus according to claim 1, wherein the bracket is provided outside a side part of the seat back frame.

5. The airbag apparatus according to claim 1, wherein the bracket is provided inside a side part of the seat back frame.

6. The airbag apparatus according to claim 1, wherein the bracket is provided at an upper edge part of the seat back frame.

7. The airbag apparatus according to claim 1, wherein the tether is provided on a passenger side of the airbag.

8. The airbag apparatus according to claim 1, wherein:
    the airbag is a side airbag installed laterally inside the backrest of the seat, and
    the one end of the tether is attached to a first part on the base end side of the airbag, while the other end of the tether is attached to a second part on the tip side on an outer surface of the airbag in a deployed state.

9. The airbag apparatus according to claim 8, wherein the side airbag is provided on a side distant from a door by the seat.

10. The airbag apparatus according to claim 1, wherein the airbag is a shroud airbag.

11. The airbag apparatus according to claim 1, wherein:
    the airbag is housed in the backrest of the seat and deployable on both lateral sides of the seat,
    the airbag includes one or more tensile cloths which are housed in the seat, and
    the tensile cloths are deployed to an outside of the seat by deploying the airbag and stretched from an upper surface of the seat back to a seat cushion.

12. An airbag apparatus for a seat of a vehicle in combination with the seat, the airbag apparatus comprising:
    an airbag deployable from a backrest of the seat in a forward direction;
    an inflator inside the airbag for inflating the airbag in response to a signal from a sensor;
    a tether having a first end attached to a frame of the backrest and a second end attached to a forward side of the airbag; and
    a bracket attached to the seat back frame, the bracket including a hook part hooked to a side part of the seat back frame;
    wherein the tether is sandwiched between the bracket and the seat back frame and extends in the forward direction through an insertion part of the bracket.

13. The airbag apparatus according to claim 12, wherein the hook part of the bracket includes a pair of hook members at a forward side of the bracket and the tether passes between the pair of hook members.

* * * * *